United States Patent Office 3,309,412
Patented Mar. 14, 1967

3,309,412
METHOD OF PREVENTING THE POLYMERIZATION OF BUTADIENE
Taketami Sakuragi and Yoshio Jyo, Tokyo, Tsuneo Yomo, Fujisawa-shi, and Yoshinobu Asano, Yokohama, Japan, assignors to The Japanese Geon Company, Ltd., Minato-ku, Tokyo, Japan, a corporation of Japan
No Drawing. Filed Mar. 5, 1965, Ser. No. 437,591
Claims priority, application Japan, Apr. 17, 1964, 39/21,527
10 Claims. (Cl. 260—666.5)

This invention relates to a method of preventing the polymerization of butadiene and, more specifically, to a method of preventing the polymerization of butadiene at relatively high temperatures.

As processes of separating in good yield and high purity the valuable industrial raw material butadiene from the butadiene-containing gas mixtures such as the so-called $C_4$ hydrocarbon fractions whose chief constituents are, for example, butadiene, butane, butylene and isobutylene, known are the solvent absorption and the extractive distillation processes. Further, that, for example, acetonitrile, dimethylformamide and N-methylpyrrolidone are used as the solvent in these processes is also known. However, in operating in accordance with these processes, the solvent containing the butadiene is perforce exposed to temperatures of from, say, 80° to 150° C. or even higher, with the consequence that the butadiene in the solvent tends to polymerize. Hence, since difficulties occur in that clogging of the apparatus with the separating polymer and the formation of a polymeric coating on the inside walls of the apparatus take place, the continuous operation over an extended period of time becomes practically impossible.

An object of the present invention is to provide a method of preventing the polymerization of butadiene in its solvent at elevated temperatures thereby to overcome the difficulties such as hereinabove described during the separation of butadiene from mixed gases containing butadiene by means of the solvent absorption or the extractive distillation process.

Other objects of this invention will be obvious from the contents of the specification hereinafter disclosed.

We engaged in much research for attainment of these objects, and as a result, found that by incorporating furfural, benzaldehyde or the aromatic nitro compounds in the solvents of butadiene generally used in the solvent absorption or extractive distillation process, for example, such as acetonitrile, dimethylformamide and N-methylpyrrolidone, the polymerization of butadiene could be effectively prevented, even when the solution of butadiene using these solvents are exposed to elevated temperatures. In addition, it was found that when these compounds were present in the solution the polymerization of butadiene could be prevented even in those cases where iron rust was present which was generally considered to promote the polymerization of butadiene. Hence, when the foregoing solvents incorporated with these compounds in accordance with the present invention are used, it becomes possible to separate butadiene stably and continuously over an extended period of time from the mixed gases containing butadiene by means of the solvent absorption and extractive distillation processes, without employing an apparatus consisting of such expensive materials as stainless steel.

Although the amount used of the furfural, benzaldehyde or aromatic nitro compounds is capable of wide variation depending upon such factors as the class of solvent, the water content of the solvent, operating conditions and the presence or absence of iron rust, in general, the objectives of this invention can be achieved by the incorporation of about 0.01–10%, and preferably 0.05–5%, based on the weight of the solvent. It is, of course, possible to add these compounds in amounts in excess of the foregoing range, as no particular detrimental effects are observed. Especially suitable of the compounds falling within the aromatic nitro compounds include nitrobenzene, the nitrobenzene derivatives such as halo-substituted nitrobenzenes (e.g., 1-chloro-2-nitrobenzene) and alkyl-substituted nitrobenzenes (e.g. nitrotoluenes) and the dinitrobenzene derivatives such as o-, p- and m-dinitrobenzene, halo-substituted dinitrobenzenes (e.g. 1-chloro-2,4-dinitrobenzene) and alkyl-substituted dinitrobenzenes (e.g. dinitrotoluenes).

The effect of preventing the polymerization of butadiene by the incorporation of furfural, benzaldehyde or the aromatic nitro compounds according to this invention is further promoted by the cojoint presence in the system of substances which are well-known and used as polymerization inhibitors or stabilizers of unsaturated compounds, in their normally used amounts or less. Presumably, this is the result of a synergistic action of some sort or other that takes place between these substances and the additive of the present invention. Known substances of this class include, for example, sodium nitrile, Methylene Blue, sulfur and the phenolic compounds such as tertiary butyl catechol, and aromatic amines such as beta-naphthylamine.

Examples 1–15

An autoclave in which formation of iron rust is noted on its inside wall was charged with dimethylformamide and the various compounds in the amounts hereinafter indicated. While maintaining a temperature of 120° C. in a state wherein the mixtures were in contact with the iron rust, butadiene was introduced to a gauge pressure of 4 kg./cm.$^2$. When the state of the solutions was observed 72 hours later, they were as follows:

| Ex. | Additive | State of Solution |
|---|---|---|
| 1 | None | Polymer separated. |
| 2 | Sodium nitrite (200 p.p.m.) | Do. |
| 3 | Methylene Blue (200 p.p.m.) | Do. |
| 4 | Sulfur (1,500 p.p.m.) | Do. |
| 5 | Tertiary butyl catechol (200 p.p.m.) | Do. |
| 6 | Beta-naphthylamine (200 p.p.m.) | Do. |
| 7 | Furfural (3 vol. percent) | Slightly turbid. |
| 8 | Furfural (5 vol. percent) | Practically transparent. |
| 9 | Furfural (3 vol. percent) and sodium nitrite (200 p.p.m.). | Perfectly transparent. |
| 10 | Furfural (3 vol. percent) and Methylene Blue (100 p.p.m.). | Do. |
| 11 | Furfural (0.5 vol. percent) and Methylene Blue (200 p.p.m.). | Do. |
| 12 | Furfural (3 vol. percent) and sulfur (500 p.p.m.). | Do. |
| 13 | Furfural (0.25 vol. percent) and sulfur (1,500 p.p.m.). | Do. |
| 14 | Furfural (3 vol. percent) and tertiary butyl catechol (200 p.p.m.). | Practically transparent. |
| 15 | Furfural (3 vol. percent) and beta-naphthylamine (200 p.p.m.). | Do. |

Examples 16–19

The autoclave used in Examples 1–15 was charged with dimethylformamide and various additives in the amounts hereinafter indicated. The while maintaining a temperature of 150° C. in a state in which the mixtures were in contact with the iron rust, butadiene was introduced to a gauge pressure of 5 kg./cm.$^2$. After 20 hours, the state of the solutions were observed with the following results.

| Ex. | Additive | State of Solution |
|---|---|---|
| 16 | None | Polymer separated. |
| 17 | Sodium nitrite (200 p.p.m.) | Do. |
| 18 | Furfural (1 vol. percent) | Slightly turbid. |
| 19 | Furfural (1 vol percent) and sodium nitrite (200 p.p.m.). | Perfectly transparent. |

Comparable results were also obtained when the furfural was substituted with benzaldehyde and the treatment was carried out under identical conditions as hereinabove described.

Further, when instead of the dimethylformamide, N-methylpyrrolidone was used as the solvent and furfural (1 vol. percent) and sodium nitrite were added thereto, after which the treatment was carried out under identical conditions, in this case also, the solution was perfectly transparent and no separation of polymer took place.

*Example 20*

The autoclave used in Examples 1–15 was charged with dimethylformamide containing 10 vol. percent of water. Then while maintaining a temperature at 150° C. in a state where contact was had with the iron rust, butadiene was introduced to a gauge pressure of 5 kg./cm.$^2$ and the treatment was carried out for 20 hours.

Although a considerable amount of polymer was formed when furfural was not added, the solution was perfectly transparent when one volume percent of furfural was added.

*Examples 21–35*

The autoclave used in Examples 1–15 was charged with dimethylformamide and the various additives in the below-indicated amounts. Then, while maintaining a temperature of 150° C. in a state wherein no contact was had with the iron rust butadiene was introduced to a gauge pressure of 5 kg./cm.$^2$. After 24 hours, the state of solutions was observed with the following results.

| Ex. | Additive | State of Solution |
| --- | --- | --- |
| 21 | None | Polymer separated. |
| 22 | Sodium nitrite (200 p.p.m.) | Do. |
| 23 | Methylene Blue (200 p.p.m.) | Do. |
| 24 | Sulfur (500 p.p.m.) | Do. |
| 25 | Tertiary butylcatechol (200 p.p.m.) | Do. |
| 26 | Nitrobenzene (0.1 vol. percent) | Do. |
| 27 | Nitrobenzene (0.5 vol. percent) | Practically transparent. |
| 28 | Nitrobenzene (0.1 vol. percent) and sodium nitrite (200 p.p.m.). | Perfectly transparent. |
| 29 | Nitrobenzene (0.1 vol. percent) and Methylene Blue (200 p.p.m.). | Do. |
| 30 | Nitrobenzene (0.1 vol. percent) and sulfur (500 p.p.m.). | Do. |
| 31 | Nitrobenzene (0.1 vol. percent) and tertiary butylcatechol (200 p.p.m.). | Practically transparent. |
| 32 | m-Nitrobenzene (0.25 wt. percent) | Do. |
| 33 | m-Dinitrobenzene (0.1 wt. percent) and sodium nitrite (200 p.p.m.). | Do. |
| 34 | 1-chloro-2,4-dinitrobenzene (0.1 wt. percent) and sodium nitrite (200 p.p.m.). | Do. |
| 35 | Dinitrotoluene (0.1 wt. percent) and sodium nitrite (200 p.p.m.). | Do. |

*Example 36*

In the autoclave used in Examples 1–15, acetonitrile was maintained at a temperature of 120° C. in a state wherein it was in contact with the iron rust. Then the treatment was carried out for 24 hours by introducing butadiene to a gauge pressure of 13 kg./cm.$^2$.

Whereas a slight turbidity was noted when 0.1 volume percent of nitrobenzene was added, the solution was perfectly transparent when nitrobenzene (0.1 vol. percent) and Methylene Blue (200 p.p.m.) were added.

We claim:

1. A method of reducing the tendency of butadiene to polymerize in solutions exposed to elevated temperatures, or elevated temperatures and iron rust, which comprises adding to the solution, as a polymerization inhibitor, furfural in an amount of 0.01 percent to 10 percent by weight based on the solvent.

2. A method of reducing the tendency of butadiene to polymerize in solutions exposed to elevated temperatures, or elevated temperatures and iron rust, which comprises adding to the solution, as a polymerization inhibitor, benzaldehyde in an amount of 0.01 percent to 10 percent by weight based on the solvent.

3. A method of reducing the tendency of butadiene to polymerize in solutions exposed to elevated temperatures, or elevated temperatures and iron rust, which comprises adding to the solution, as a polymerization inhibitor, an aromatic nitro compound in an amount of 0.01 percent to 10 percent by weight based on the solvent.

4. A method according to claim 3, wherein the aromatic nitro compound is nitrobenzene.

5. A method according to claim 3, wherein the aromatic nitro compound is dinitrobenzene.

6. A method according to claim 3, wherein the aromatic nitro compound is monohalodinitrobenzene.

7. A method according to claim 3, wherein the aromatic nitro compound is dinitrotoluene.

8. A method according to claim 1, wherein, in addition to the said polymerization inhibitor, there is also added a known inhibitor for the polymerization of butadiene in butadiene solutions.

9. A method according to claim 2, wherein, in addition to the said polymerization inhibitor, there is also added a known inhibitor for the polymerization of butadiene in butadiene solutions.

10. A method according to claim 3, wherein, in addition to the said polymerization inhibitor, there is also added a known inhibitor for the polymerization of butadiene in butadiene solutions.

References Cited by the Examiner

UNITED STATES PATENTS 2,478,045 8/1949 Hatch et al. _____ 260—666.5
2,730,489 1/1956 Lewis _____ 260—666.5

DELBERT E. GANTZ, *Primary Examiner.*

G. E. SCHMITKONS, *Assistant Examiner.*

UNITED STATES PATENT OFFICE
CERTIFICATE OF CORRECTION

Patent No. 3,309,412                            March 14, 1967

Taketami Sakuragi et al.

It is hereby certified that error appears in the above numbered patent requiring correction and that the said Letters Patent should read as corrected below.

Column 2, line 24, for "nitrile" read -- nitrite --; column 3, in the table, second column, line 16, for "m-Nitrobenzene" read -- m-Dinitrobenzene --.

Signed and sealed this 14th day of November 1967.

(SEAL)
Attest:

Edward M. Fletcher, Jr.                          EDWARD J. BRENNER
Attesting Officer                                 Commissioner of Patents